US012362487B2

(12) United States Patent
Le Gall et al.

(10) Patent No.: US 12,362,487 B2
(45) Date of Patent: Jul. 15, 2025

(54) ELEMENTARY ANTENNA OF THE SLOT-FED PATCH TYPE AND ACTIVE ARRAY ANTENNA

(71) Applicants: THALES, Courbevoie (FR); UNIVERSITÉ DE BORDEAUX, Bordeaux (FR); INSTITUT POLYTECHNIQUE DE BORDEAUX, Talence (FR); Centre national de la recherche scientifique, Paris (FR)

(72) Inventors: TimothéE Le Gall, Elancourt (FR); Anthony Ghiotto, Talence (FR); GwenaëL Morvan, Elancourt (FR); Stefan Varault, Trappes (FR); Bruno Louis, Trappes (FR); Grégoire Pillet, Trappes (FR)

(73) Assignees: THALES, Courbevoie (FR); UNIVERSITÉ DE BORDEAUX, Bordeaux (FR); INSTITUT POLYTECHNIQUE DE BORDEAUX, Talence (FR); CENTRE NATIONAL DE LA RECHERCHE SCIENTIFIQUE, Paris (FR)

( * ) Notice: Subject to any disclaimer, the term of this patent is extended or adjusted under 35 U.S.C. 154(b) by 157 days.

(21) Appl. No.: 18/348,090

(22) Filed: Jul. 6, 2023

(65) Prior Publication Data

US 2024/0014564 A1 Jan. 11, 2024

(30) Foreign Application Priority Data

Jul. 7, 2022 (FR) ................................. FR2206934

(51) Int. Cl.
*H01Q 9/04* (2006.01)
*H01Q 1/48* (2006.01)
*H01Q 21/24* (2006.01)

(52) U.S. Cl.
CPC ............... *H01Q 9/045* (2013.01); *H01Q 1/48* (2013.01); *H01Q 21/24* (2013.01)

(58) Field of Classification Search
CPC .. H01Q 21/065; H01Q 13/106; H01Q 13/206; H01Q 21/0093; H01Q 9/065;
(Continued)

(56) References Cited

U.S. PATENT DOCUMENTS 5,241,321 A 8/1993 Tsao
6,989,793 B2 * 1/2006 Van Der Poel ...... H01Q 13/106 343/700 MS
(Continued)

FOREIGN PATENT DOCUMENTS

CN 105552550 A 5/2016

OTHER PUBLICATIONS

Search Report for French Application No. 22 06934 dated Jan. 27, 2023.

*Primary Examiner* — Monica C King
(74) *Attorney, Agent, or Firm* — McDonald Hopkins LLC

(57) ABSTRACT

The elementary antenna 1 includes: two cross-shaped slots 32, 33 defining four half-slots; for each half-slot, excitation striplines 41, 42, the first stripline 41 being connected to a first via 61 and the second stripline 42 being connected to a second via 62; an integrated circuit 70 delivering a plurality of ports; for each half-slot, tracks for feeding the strips, the first track 51 running from a first port 71 to the first via 61 and the second track 52 running from a second port 72 to the second via 62, the first and second ports being two successive ports of the integrated circuit, differentially connected
(Continued)

to a transmitter/receiver channel by first and second power lines situated inside the integrated circuit, the lines and tracks running so that there is no crossing of the respective routes thereof.

10 Claims, 4 Drawing Sheets

(58) Field of Classification Search
CPC ...... H01Q 13/10; H01Q 21/005; H01Q 9/045; H01Q 1/48; H01Q 21/24
See application file for complete search history.

(56) References Cited

U.S. PATENT DOCUMENTS

| | | | | |
|---|---|---|---|---|
| 10,727,595 | B2 | 7/2020 | Liu et al. | |
| 11,189,927 | B2 | 11/2021 | Liu et al. | |
| 2004/0189527 | A1 * | 9/2004 | Killen .................. | H01Q 9/0414 343/770 |
| 2014/0104135 | A1 * | 4/2014 | Delestre ............... | H01Q 21/065 343/893 |
| 2019/0372239 | A1 | 12/2019 | Garrec et al. | |
| 2019/0372240 | A1 | 12/2019 | Garrec et al. | |

* cited by examiner

ELEMENTARY ANTENNA OF THE SLOT-FED PATCH TYPE AND ACTIVE ARRAY ANTENNA

CROSS-REFERENCE TO RELATED APPLICATIONS

This application claims priority from French Patent Application No. 22 06934 filed on Jul. 7, 2022. The content of this application is incorporated herein by reference in its entirety.

The present invention relates to a "slot-fed patch" elementary antenna of an active array antenna.

An active array antenna, in particular an Active Electronically Scanned Array (AESA) antenna, is a mosaic of a plurality of identical elementary antennas.

For active array antennas, there is a need to be able to transmit a signal with a high peak power.

If it is the electronic transmission chain upstream of the active antenna which prepares the high-power signal, which requires amplifier summations with low efficiencies and additional losses at the end of amplification, i.e. at the moment when the efficiencies are the most crucial. Moreover, it is then necessary to deliver the high power signal to the radiating element of each elementary antenna, which causes additional losses and requirements for delivering high power signals.

Another alternative consists in preparing such power signal in each elementary antenna by combining a plurality of reduced power signals applied to the input of the elementary antenna.

The power combination in the elementary antenna is achieved by two pairs of feed points (the number of feed points being four).

For example, as illustrated in FIG. 1, the applicant company produces an active array antenna, one elementary antenna 101 of which is a slot-fed patch antenna; The radiating element is herein a metal plane ("patch") or a combination of metal planes, arranged on a front face of the elementary antenna, and which is excited by a pair of slots: first and second slots, 132 and 133, orthogonal to each other so as to form a cross-shaped pattern.

Each slot is excited by a pair of striplines 142 and 146 for the first slot 132 and 144 and 148 for the second slot 133, which overlap the slot at two excitation points arranged symmetrically on both sides of the geometric center of the elementary antenna.

For feeding the striplines, an integrated circuit 170 is arranged on a rear face of the elementary antenna. The integrated circuit has as many feeding ports 172, 174, 176 and 178 as there are striplines to be fed.

Electrical tracks 152, 154, 156 and 158 connect each port of the integrated circuit 170 to the end of the associated stripline (through vias 162, 164, 166 and 168).

In order to be able to excite appropriately the main mode TE10 of a slot, the two excitation striplines of the slot should be fed exactly out of phase, i.e. in differential mode.

Thereby, inside the integrated circuit 170, two opposite ports are connected to the output of the same transmission/reception channel by two feed lines. Thus, the ports 172 and 176 are fed differentially from the channel 182 by lines 192 and 196 and the ports 174 and 178 are fed differentially from the channel 183 by lines 194 and 198.

It can be seen that it is then necessary to cross the feed lines within the integrated circuit (cross 184 in FIG. 1) or the feeding tracks.

Routing inside or outside the integrated circuit is thus not optimal and generates losses and imbalances between the striplines and consequently in the functioning of the elementary antenna.

Moreover, the reproducibility of the routing from one elementary antenna to another is difficult to achieve, so that there is a considerable dispersion of the characteristics of the elementary antennas forming an antenna. The properties of the antenna are thus degraded.

The goal of the present invention is to bring a solution to the above problem.

For this purpose, the subject matter of invention is a slot-fed patch elementary antenna for an active array antenna, characterized in that, the radiating plane is arranged on a front face of the elementary antenna, the elementary antenna including: a ground plane having first and second slots, orthogonal to each other so as to form a cross pattern defining four half-slots; for each half-slot, a stripline for exciting the half-slot, a first stripline of the pair of striplines being connected at one end thereof to a first via associated with the first stripline and overlapping the half-slot from a first side to a second side of the half-slot, a second stripline of the pair of striplines being connected at one end thereof to a second via associated with the second stripline and overlapping the half-slot from the second side to the first side of the half-slot, the first and second striplines of the pair of striplines running without crossing each other; an integrated circuit arranged on a rear face of the elementary antenna, a contour of the integrated circuit delivering a plurality of ports; for each half-slot, a pair of feed tracks of the pair of striplines for exciting the half-slot, a first track of the pair of feed tracks running from a first port of the integrated circuit to the first via, a second track of the pair of feed tracks running from a second port of the integrated circuit to the second via, the first and second ports being two successive ports along the contour of the integrated circuit, which are differentially connected to a transmitter/receiver channel of the elementary antenna by first and second feed lines located inside the integrated circuit, the lines and tracks running so that there is no crossing in the routing or lines inside the printed circuit, nor tracks outside the printed circuit.

According to particular embodiments, the horn antenna includes one or more of the following features, taken individually or according to all technically possible combinations:

- the integrated circuit is a monolithic microwave integrated circuit,
- the vias are arranged on the periphery of the elementary antenna close to the edges thereof and, for each half-slot, the first and second connecting vias of the pair of striplines for exciting the half-slot are two successive vias along the periphery of the elementary antenna,
- for each half-slot, the first and second striplines of a pair of striplines for exciting the half-slot have the same length,
- for each half-slot, the first and second striplines of a pair of striplines for exciting the half-slot run parallel to each other,
- for each half-slot, the first and second striplines of a pair of striplines for exciting the half-slot are spaced apart by a distance providing an electrical isolation of the first and second striplines while exciting the half-slot at two nearby excitation points, so as to consider the half-slot as being locally excited,
- a stripline intersects a half-slot orthogonally, the first and second tracks of the pair of feed tracks associated with a half-slot have the same length; and the elementary antenna is symmetrical by rotation of 90° about an axis normal to the radiating plane.

A further subject matter of the invention is an array antenna including a plurality of active antennas identical to the preceding active antenna.

The invention and the advantages of the invention will better understood upon reading the following detailed description of the different embodiments of the invention, given only as an illustrative example and not limited to, the description being made with reference to the enclosed drawings, wherein.

An active array antenna, in particular with electronic scanning, is a mosaic consisting of a plurality of identical elementary antennas.

The present invention relates to the case of an active array antenna the elementary antennas of which are of "slot-fed patch" antennas. A patch is a metal plane printed on a substrate. The radiating element of the elementary antenna consists of at least one patch.

Figure 2:
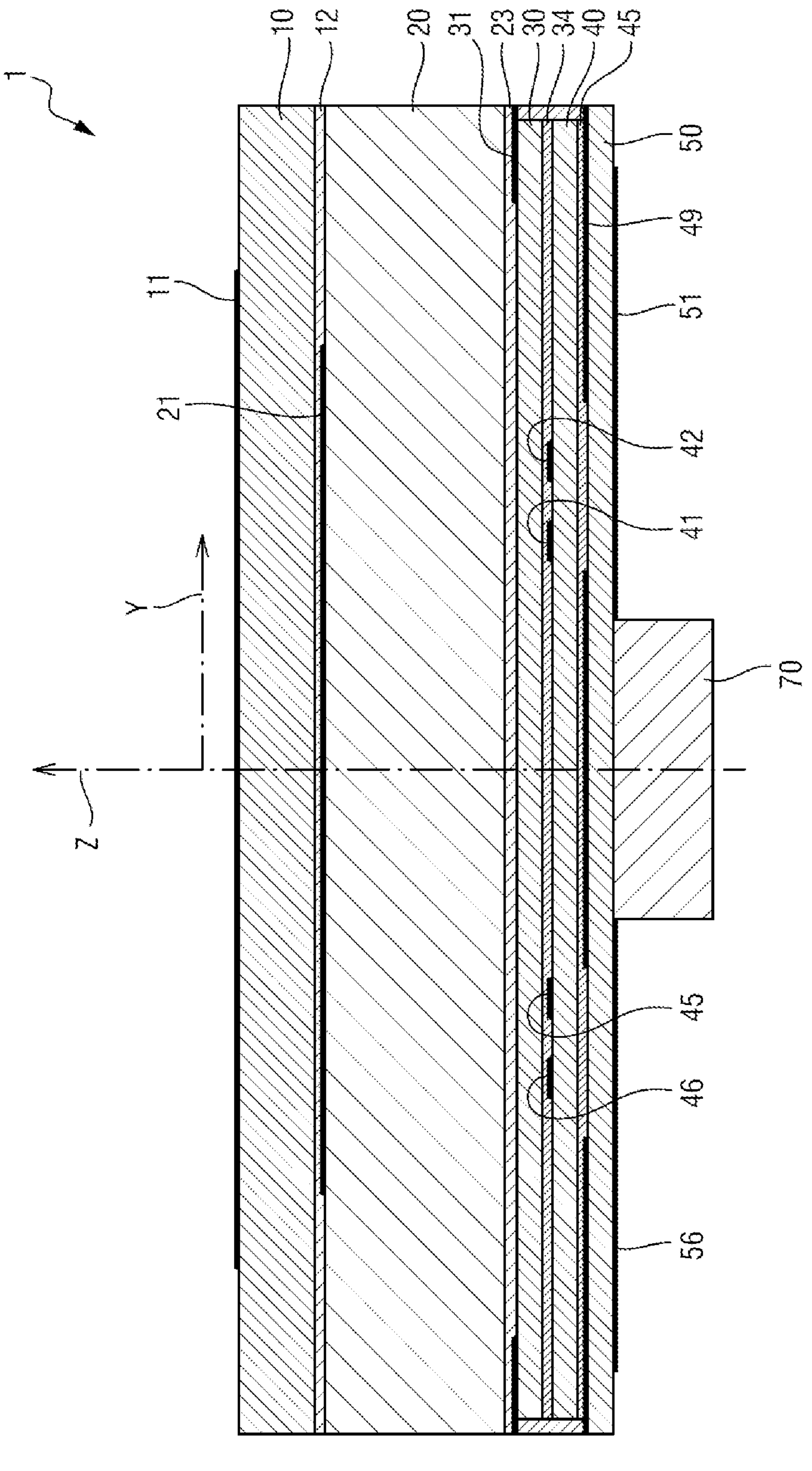
FIG. 2 is a perspective cross-section view of a preferred embodiment of an elementary antenna according to the invention.

FIG. 2 is a cross section of a preferred embodiment of an elementary antenna 1 according to the invention.

The elementary antenna 1 includes four substrates, stacked one on top of the other along a so-called "vertical" axis Z:

a first substrate 10, which is the so-called "antenna" substrate, on an upper surface of which a first patch 11 is etched. The upper surface forms the front face of the elementary antenna.

a second substrate 20, on an upper surface of which a second patch 21 is etched.

a third substrate 30, an upper surface of which carries an upper ground plane 31, which is provided with slots.

a fourth substrate 40, an upper surface of which carries a plurality of striplines for exciting the slots.

a fifth substrate 50, a lower surface of which carries both the integrated circuit 70 and the feed tracks of the striplines. A track is connected to a port of the integrated circuit 70 and to a via. The via crosses through the fifth and fourth substrates to connect the track to the associated stripline. Thus, there is one track per stripline. The upper surface of the substrate 50, oriented towards the patch or patches, includes a lower ground plane 49 wherein recesses (or holes) are etched in order to produce the aforementioned via connection.

The different substrates are associated with one another, e.g. by means of a suitable adhesive: an interface layer between the first and second substrates bears the reference 12 in FIG. 2; an interface layer between the second and third substrates bears the reference 23 in FIG. 2; an interface layer between the third and fourth substrates bears the reference 34 in FIG. 2; and an interface layer between the fourth and fifth substrates bears the reference 45 in FIG. 2.

Figure 3:
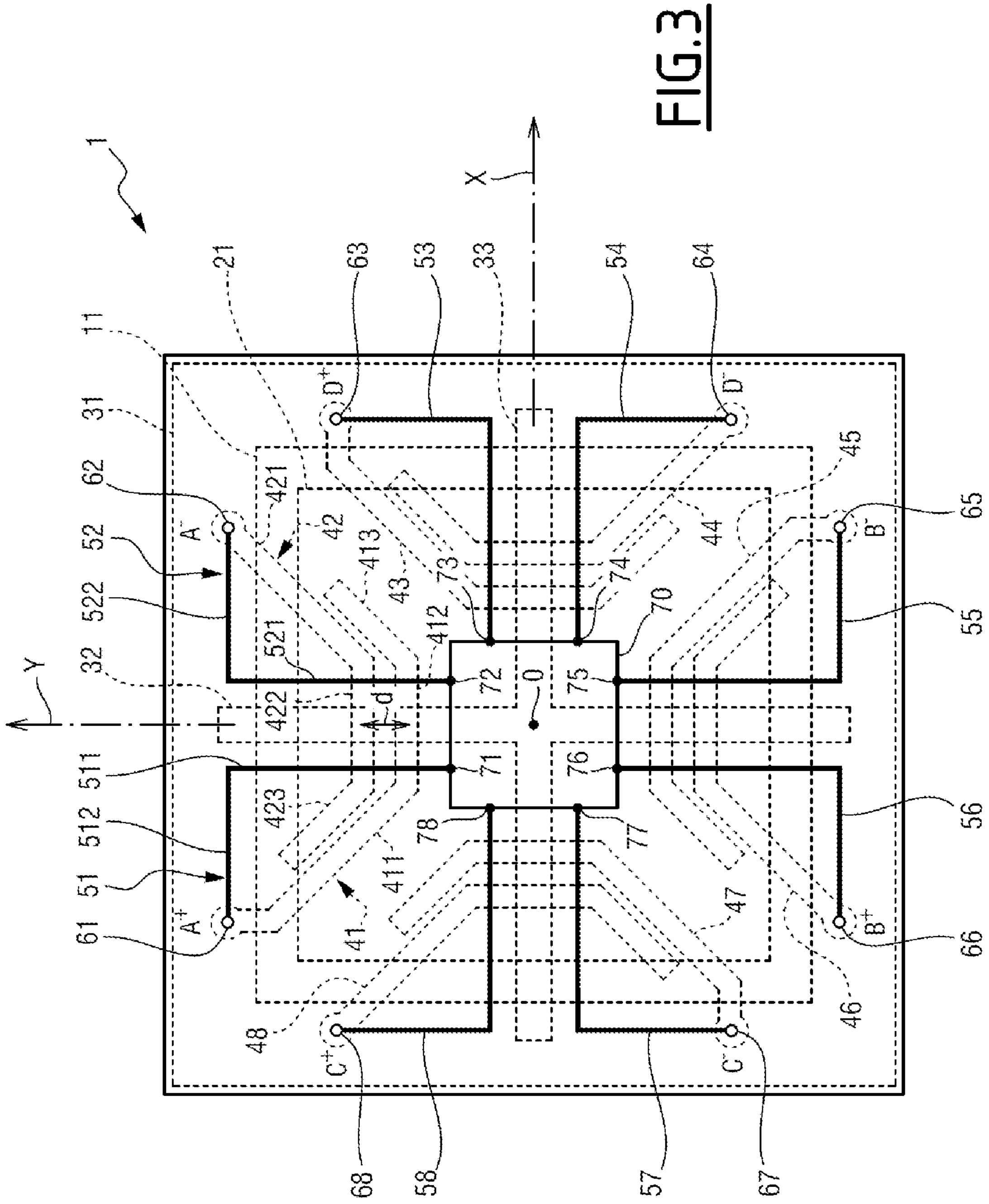
FIG. 3 is a bottom view representation of the elementary antenna shown in FIG. 2; and, FIG. 4 is an electrical representation of the feed means of the elementary antenna shown in FIG. 2.

FIG. 3 is a bottom view of the elementary antenna 1 shown in FIG. 2, i.e. in a plane transverse to the axis Z. The transverse plane is defined by axes X and Y. In said figure, the patches 11 and 21, the ground plane 31 and the slots with which same is provided, as well as the different excitation striplines of the slots, have been represented as dotted lines.

The elementary antenna 1 preferentially has a square shape. Same has a central symmetry with respect to the center O thereof, but above all a symmetry by a 90° rotation about the center O. In a variant, the elementary antenna can take other forms, in particular rectangular or circular.

Two slots 32 and 33 are provided in the ground plane 31. The slots are oblong.

In the embodiment shown, the slots are rectangular, but in a variant same could have ends so that a slot has a "dog bone", "dumbbell", shape or the like.

Each slot has a reduced width compared to the length thereof, the latter being slightly shorter than the length of the side of the elementary antenna.

The slots are arranged so that the major axis of the first slot 32 coincides with the Y axis and the major axis of the second slot 33 coincides with the X axis.

The two slots consequently intersect at right angles at the geometric center O of the elementary antenna 1, so as to form a cross-shaped pattern.

The cross-shaped pattern can be seen as consisting of four half-slots, a first positive half-slot corresponding to the part of the first slot 32 above the X axis, a first negative half-slot corresponding to the part of the first slot 32 below the X axis, a second positive half-slot corresponding to the part of the second slot 33 to the right of the Y axis, a second negative half-slot corresponding to the part of the second slot 33 to the left of the Y axis shown in FIG. 3.

Hereinafter, unless otherwise stated, the elementary antenna is described in detail with respect to a particular half-slot, in the present case, the first upper half-slot.

The half-slot is excited by a pair of striplines. The pair of striplines includes a first stripline 41 and a second stripline 42 which do not overlap.

In the present embodiment, a stripline is consists of a plurality of rectilinear portions. The first stripline 41 thereby includes a proximal portion 411, an intermediate portion 412, and a distal portion 413. The second stripline 42 there includes a proximal portion 421, an intermediate portion 422, and a distal portion 423.

The proximal portion of a stripline is connected to a first via associated with the stripline, a first via 61 for the first stripline 41 and a second via 62 for the second stripline 42, respectively. The vias are herein arranged on the periphery of the antenna near the edges thereof.

The first stripline 41 runs e.g. from the via 61 (situated to the left of the X axis) so that the proximal portion thereof makes an angle of −45° with respect to the X axis of the half-slot, the intermediate portion thereof overlaps the half-slot perpendicularly to the X axis of the half-slot and the distal portion thereof forms an angle of +45° with respect to the X axis of the half-slot.

Similarly, the second stripline 42 runs from the via 62 (situated to the right of the X axis) so that the proximal portion thereof makes an angle of +45° with respect to the X axis of the half-slot, the intermediate portion thereof overlaps the half-slot perpendicularly to the X axis of the half-slot and the distal portion thereof forms an angle of −45° with respect to the X axis of the half-slot.

Other paths can be envisaged for the strips: rectilinear portions making other angles with respect to the X axis (the Y axis, respectively), curvilinear portions, etc.

The first stripline 41 preferentially crosses the half-slot orthogonally in a first excitation point. The first crossing is made by crossing the half-slot from left to right.

The second stripline 42 orthogonally crosses the half-slot in a second excitation point, further from the center O than the first excitation point. A distance d separates the first and second excitation points along the X axis. The distance is reduced to the maximum, while maintaining an electrical isolating gap between the striplines.

The distance d is minimum so that the excitation of the half-slot by the pair of striplines takes place essentially locally, i.e. it can be considered that the application of a first excitation electric field at the first excitation point and of a second excitation electric field at the second excitation point, is equivalent to the application of an excitation electric field (resulting from the sum of the first and second excitation electric fields) at a midpoint between the first and second excitation points.

The second crossing takes place by crossing the half-slot from right to left. The head-to-tail configuration of such particular embodiment requires, ceteris paribus, that the electrical potential A− to which the second stripline 42 is brought, is phase-shifted by 180° with respect to the electrical potential A+ to which the first stripline 41 is brought, so that the electric fields generated are in phase, so as to properly excite the first slot.

The first and second striplines run parallel to each other. Preferentially, it is tried to maintain a constant offset between the first and second striplines 41 and 42, for reasons of coupling between the striplines of the same pair of striplines.

Each stripline continues beyond the half-slot, so as to optimize impedance matching ("stub"). Ideally the two striplines have the same length so that the striplines have the same impedance. For this purpose, the proximal portion of the second stripline, a priori shorter in the embodiment shown in the figures, can be lengthened, e.g. by a meander at the connection to the second via. Alternatively, a phase shift can be brought fed the signals delivered to each port of the integrated circuit, where the phase shift can be produced either by adding a line length upstream of said port or directly by a phase shifter integrated into the integrated circuit.

A similar description could be made for the pair of excitation striplines 43, 44 of the second positive half-slot (associated vias 63 and 64 and feed potentials D+ and D−), for the pair of excitation striplines 45, 46 of the first negative half-slot (associated vias 65 and 66 and potentials B+ and B−), for the pair of excitation striplines 47, 48 of the second negative half-slot (associated vias 67 and 68 and potentials C+ and C−).

The means of feeding the striplines have to apply phase-matched voltages so that the elementary antenna transmits a polarized wave.

The table below shows the phase control for the elementary antenna to transmit according to different polarizations.

| A+ | A− | B+ | B− | C+ | C− | D+ | D− | Polarization (with respect to the X axis) |
|---|---|---|---|---|---|---|---|---|
| 0° | 180° | 0° | 180° | 0° | 180° | 0° | 180° | 45° |
| 0° | 180° | 0° | 180° | 180° | 0° | 180° | 0° | −45° |
| 0° | 180° | 0° | 180° | 90° | 270° | 90° | 270° | Right-hand circular |
| 0° | 180° | 0° | 180° | 270° | 90° | 270° | 90° | Left-hand circular |
| 0° | 180° | 0° | 180° | OFF | OFF | OFF | OFF | Horizontal |
| OFF | OFF | OFF | OFF | 0° | 180° | 0° | 180° | Vertical |

It should be noted that a slot is excited symmetrically with respect to the center O by two pairs of striplines so as to function in the TE10 mode.

The means of feeding the pair of striplines include an integrated circuit 70 and feed tracks running on the rear face of the elementary antenna.

The circuit 70 is e.g. a Monolithic Microwave Integrated Circuit (MMIC).

Same has e.g. a parallelepiped shape. For example, the circuit also has a square contour in the transverse XY plane.

Same is located at the center O of the rear face of the elementary antenna so that the sides thereof are parallel to the sides of the elementary antenna.

Each of the four sides of the circuit has two ports (or connection tabs), referenced by 71 to 78 in FIG. 3. The circuit 70 thus has eight output ports in total.

A power stripline electrically connects a port of the circuit to a via associated with a stripline.

Thereby, a pair of feed tracks 51 and 52 is associated with the pair of striplines 41 and 42 which excite the first positive half-slot. The first stripline 41 is fed by a first dedicated track 51 through the via 61, while the second stripline 42 is fed by a second dedicated track 42 through the via 62.

The first and second tracks 51 and 52 are connected to ports of the circuit 70 situated on the same side of the integrated circuit 70, in the present case the ports 71 and 72 on the side of the circuit 70 facing the vias 61 and 62.

It should be noted that the vias are herein arranged on the periphery of the elementary antenna close to the edges thereof. The first and second vias 61 and 62 are successive vias along the periphery of the antenna.

The first track 51 has e.g. the shape of an "L", with an axial section 511, which runs parallel to the X axis of the first positive half-slot from the port 71 for connection to the integrated circuit 70, followed by a lateral section 511 which runs transversely to the X axis to join the first via 61. Symmetrically, the second track 52 includes an axial section 521 which runs parallel to the X axis, followed by a lateral section 522 which runs transversely to the X axis to join the second via 62.

The first and second vias 61 and 62 cross through the fifth and fourth substrates and 40, so as to electrically connect an associated track and stripline. Each via crosses through the ground plane provided on the upper surface of the fifth substrate at a recess provided in the ground plane.

The impedances seen by each port 71 and 72 should be as close as possible to each other.

A similar description could be made for the feeding of the pair of striplines 43 and 44 from ports 73 and 74 by the feed tracks 53 and 54 respectively, for feeding the pair of striplines 45 and 46 from the ports 75 and 76 through the feed tracks 55 and 56 respectively, and for feeding the pair of striplines 47 and 48 from the ports 77 and 78 through the feed tracks 57 and 58 respectively.

Figure 4:
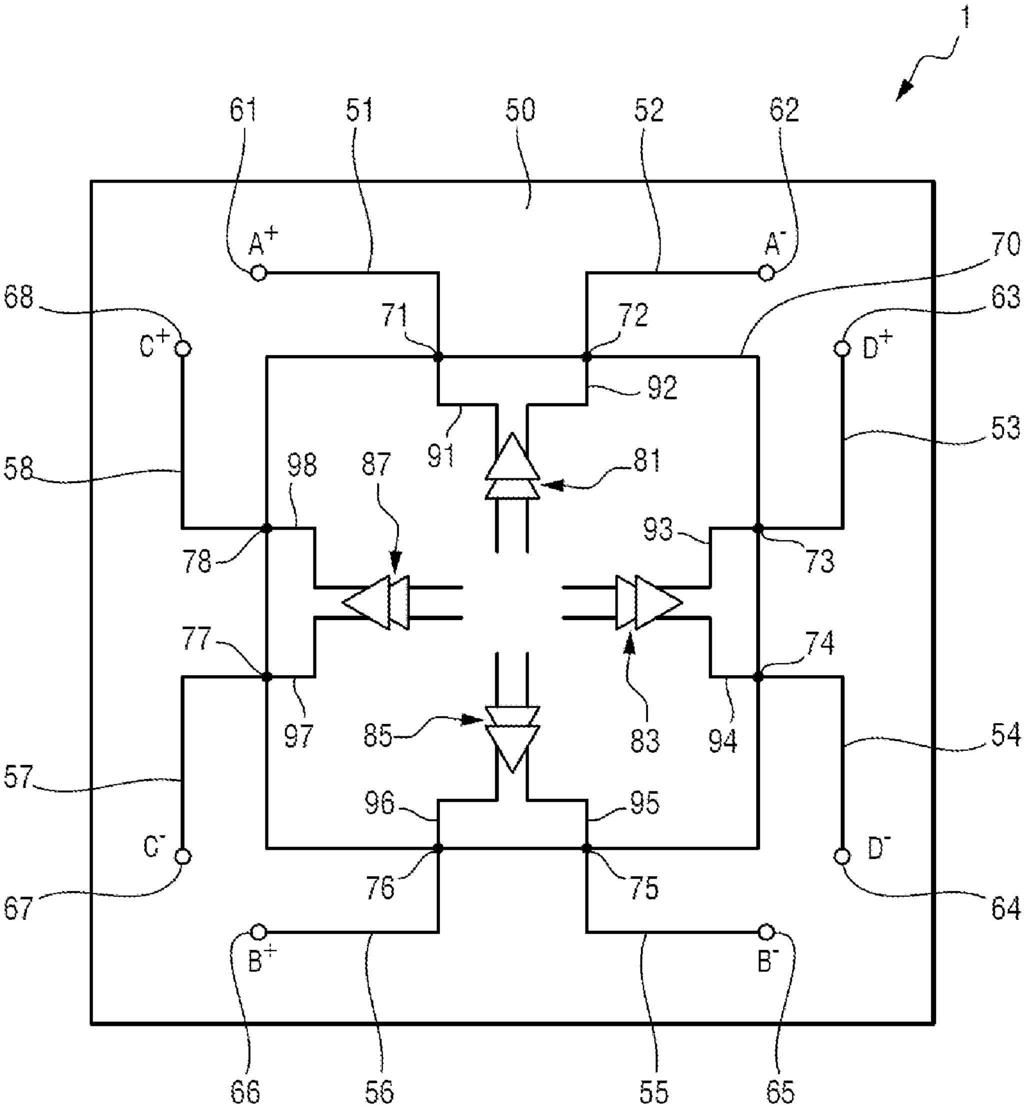

FIG. 4 is an electrical representation illustrating the routing inside and outside the integrated circuit 70.

A pair of ports for feeding a pair of striplines, such as the pair 71 and 72 for feeding the pair of striplines of the first positive half-slot, is fed differentially at the output of a transmitter/receiver channel 81 (shown schematically in FIG. 4), by a first line 91 connected to the first port 71 and a second line 92 connected to the second port 72.

Similarly, the pair of feed ports 73 and 74 of the pair of striplines of the second positive half-slot, is fed with differentially at the output of a transmission/reception channel 83 by a first line 93 connected to the first port 73 and a second line 94 connected to the second port 74.

Similarly, the pair of feed ports 75 and 76 of the pair of striplines of the first lower half-slot, is supplied differentially at the output of a transmission/reception channel 85 by a first line 95 connected to the first port 75 and a second line 96 connected to the second port 76.

Similarly, the pair of feed ports 77 and 78 of the pair of striplines of the second negative half-slot, is fed differentially at the output of a transmission/reception channel 87 by a first line 97 connected to the first port 77 and a second line 98 connected to the second port 78.

In said figure, a person skilled in the art would find that the routing is now devoid of any crossing whatsoever between the lines 91 to 97 inside the integrated circuit 70, or between the tracks 51 to 58 outside the integrated circuit 70.

The routing is thereby significantly lightened. The production of the printed circuit and the stacking of the constituent layers thereof, are thereby easier to produce.

Figure 1:
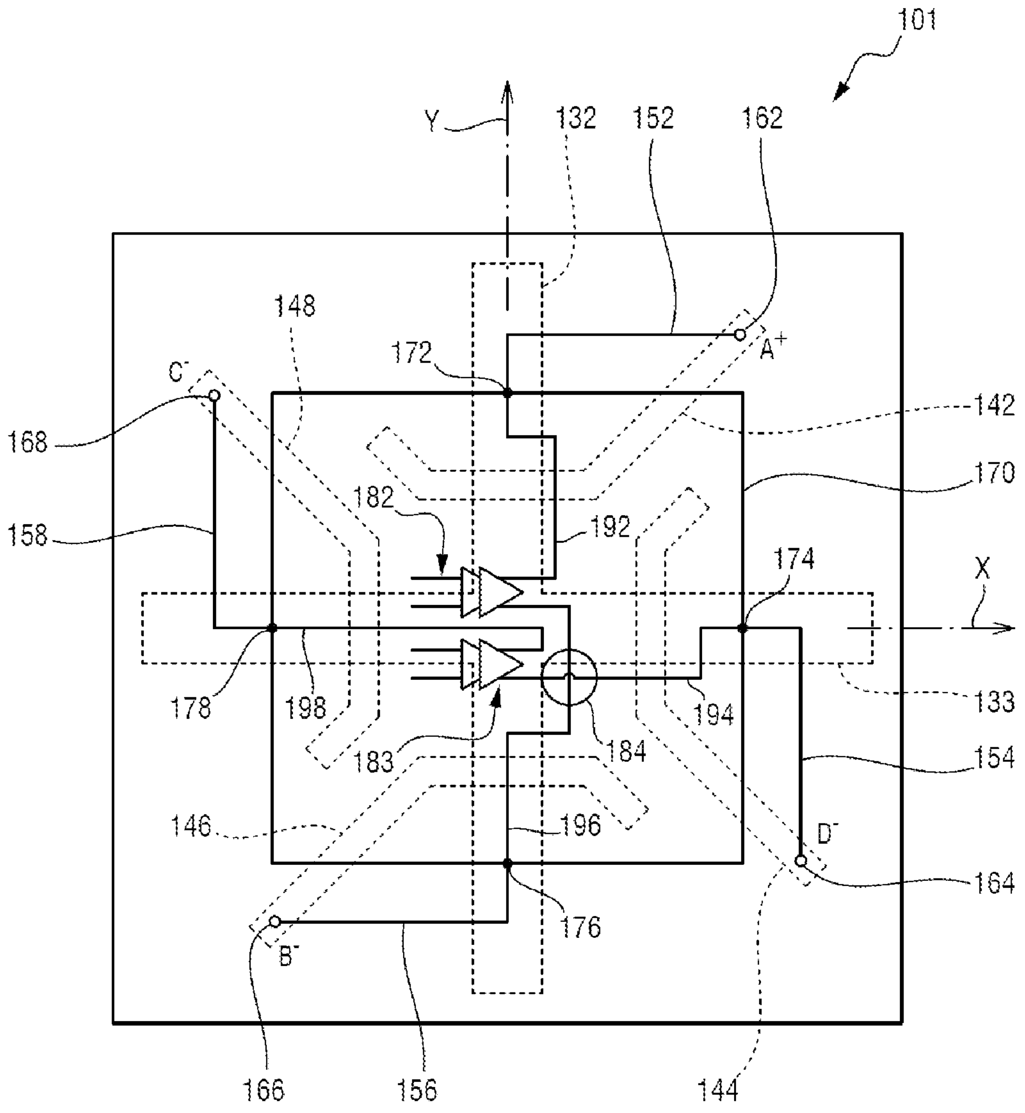
FIG.1 (PRIOR ART)
FIG. 1 is a schematic bottom view of an elementary antenna according to the a prior art.

In addition, a greater precision of manufacture of the elementary antennas is obtained, which has a positive impact on the overall operation of the active array antenna integrating such radiating elements The present invention has the advantage of having four pairs of excitation points of the slots, i.e. eight excitation points. Hence, the power emitted with respect to the configuration of FIG. 1 is thereby doubled.

In this way it is possible, in transmission, to combine the powers of eight elementary signals in order to generate a higher power signal.

The above makes it possible, in reception, to distribute the incident power over a larger number of reception channels. The power level applied to the input of the low noise amplifier—LNA of the electronic channel of the reception channel is therefore reduced, so that such component is not saturated and can function in an optimal linear range.

The present invention makes it possible to improve the efficiency by minimizing the losses.

By means of the summation in the elementary antenna, the printed circuit no longer uses as many combiners. The above contributes to the reduction of heat dissipation within the integrated circuit and to the reduction of the size of the printed circuit.

Programmable polarization. is allowed by the invention.

The present invention finds applications in the field of radars, jammers, radio communications, remote energy transfer, or further, data links.

The invention claimed is:

1. An elementary antenna for an active array antenna, the elementary antenna comprising a radiating plane fed by a plurality of slots, the radiating plane being arranged on a front face of the elementary antenna, wherein the elementary antenna includes:

a ground plane having first and second slots of the plurality of slots, the first and second slots being orthogonal to each other so as to form a cross-shaped pattern defining four half-slots;

for each half-slot, a pair of striplines for exciting the half-slot, a first stripline of the pair of striplines being connected at one end thereof to a first via associated with the first stripline and overlapping the half-slot from a first side to a second side of the half-slot, a second stripline of the pair of striplines being connected at one end thereof to a second via associated with the second stripline and overlapping the half-slot from the second side to the first side of the half-slot, the first and second striplines of the pair of striplines running without crossing each other;

an integrated circuit arranged on a rear face of the elementary antenna, a contour of the integrated circuit being provided with a plurality of ports;

for each half-slot, a pair of feed tracks of the pair of striplines enabling the half-slot to be excited, a first track of the pair of feed tracks running from a first port of the plurality of ports of the integrated circuit to the first via, a second track of the pair of feed tracks running from a second port of the plurality of ports of the integrated circuit to the second via, the first and second ports being two successive ports along the contour of the integrated circuit, which are differentially connected to a transmission/reception channel of the elementary antenna by first and second feed lines situated within the integrated circuit, the feed lines and feed tracks running so that there is no crossing, in the routing, of the feed lines inside the integrated circuit, nor of the feed tracks outside the integrated circuit.

2. The elementary antenna according to claim 1, wherein the integrated circuit is a monolithic microwave integrated circuit.

3. The elementary antenna according to claim 1, wherein the first and second vias are arranged at a periphery of the elementary antenna, near an edge thereof and, for each half-slot, the first and second vias connected to the pair of striplines exciting the half-slot are two successive vias along the periphery of the elementary antenna.

4. The elementary antenna according to claim 1, wherein, for each half-slot, the first and second striplines of the pair of striplines exciting the half-slot have an identical length.

5. The elementary antenna according to claim 1, wherein, for each half-slot, the first and second striplines of the pair of striplines exciting the half-slot run in parallel with each other.

6. The elementary antenna according to claim 1, wherein, for each half-slot, the first and second striplines of the pair of striplines exciting the half-slot are spaced apart by a distance providing an electrical insulation of the first and second striplines, while exciting the half-slot at two excitation points, the two excitation points being positioned so as to consider the half-slot as being locally excited.

7. The elementary antenna according to claim 1, wherein the first stripline and/or the second stripline orthogonally intersects the half-slot.

8. The elementary antenna according to claim 1, wherein the first and second feed tracks of the pair of feed tracks associated with the half-slot have the same length.

9. The elementary antenna according to claim 1, wherein the elementary antenna is symmetrical by a 90° rotation about an axis normal to the radiating plane.

10. Active array antenna comprising a plurality of elementary antennas, wherein each elementary antenna is an elementary antenna according to claim 1.

* * * * *